United States Patent
Kim (10) Patent No.: US 11,812,179 B2
(45) Date of Patent: Nov. 7, 2023

(54) INPUT APPARATUS FOR VEHICLE AND METHOD THEREOF

(71) Applicant: HYUNDAI MOBIS CO., LTD., Seoul (KR)

(72) Inventor: Myeong Je Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/539,355

(22) Filed: Dec. 1, 2021

(65) Prior Publication Data

US 2022/0191346 A1    Jun. 16, 2022

(30) Foreign Application Priority Data

Dec. 16, 2020    (KR) .................. 10-2020-0176789

(51) Int. Cl.
*H04N 5/04* (2006.01)
*H04N 7/18* (2006.01)
*H04N 23/56* (2023.01)
*H04N 23/74* (2023.01)
*H04N 23/745* (2023.01)

(52) U.S. Cl.
CPC .............. *H04N 5/04* (2013.01); *H04N 7/18* (2013.01); *H04N 23/56* (2023.01); *H04N 23/74* (2023.01); *H04N 23/745* (2023.01)

(58) Field of Classification Search
CPC ...... H04N 5/04; H04N 5/2256; H04N 5/2354; H04N 5/2357; H04N 7/18; H04N 5/06; B60Q 11/005; B60Q 1/0023; B60Q 1/0047
See application file for complete search history.

(56) References Cited

U.S. PATENT DOCUMENTS

| | | | |
|---|---|---|---|
| 2010/0165180 A1* | 7/2010 | Park | H04N 5/2256 348/E5.022 |
| 2014/0145921 A1* | 5/2014 | Imai | G09G 3/3688 345/87 |
| 2017/0104939 A1* | 4/2017 | Sun | H04N 5/353 |
| 2021/0021752 A1* | 1/2021 | Yao | H04N 5/353 |
| 2022/0094818 A1* | 3/2022 | Moriya | H04N 5/0736 |

FOREIGN PATENT DOCUMENTS

KR    20200027198 A    3/2020

* cited by examiner

*Primary Examiner* — Nasim N Nirjhar
(74) *Attorney, Agent, or Firm* — NovoTechIP International PLLC (57) ABSTRACT

An apparatus for controlling an operation of a vehicle according to an embodiment of the present disclosure includes an image driver that drives a camera such that an image is photographed at a predetermined photographing interval, a driver that drives an LED light source at a predetermined lighting interval, and a controller that changes the lighting interval of the LED light source to a multiple of the photographing interval after calculating the photographing interval when flickering is detected in the image photographed through the camera.

2 Claims, 7 Drawing Sheets

INPUT APPARATUS FOR VEHICLE AND METHOD THEREOF

CROSS-REFERENCE TO RELATED APPLICATION

This application claims the benefit of priority to Korean Patent Application No. 10-2020-0176789, filed in the Korean Intellectual Property Office on Dec. 16, 2020, the entire contents of which are incorporated herein by reference.

TECHNICAL FIELD

The present disclosure relates to an apparatus and method for controlling operation of a vehicle, and more particularly, relates to an apparatus and method for controlling operation of a vehicle capable of acquiring an image by a camera while a light source is turned on.

BACKGROUND

In general, a camera such as a front camera, a rear camera, a side camera, an around view monitoring or a black box may be installed in vehicles to improve the driver's convenience and support the driver.

The image photographed by the camera is displayed through a camera monitor system (CMS) in the vehicle after generating various driver support information such as other vehicle information, traffic light information, pedestrian information, and obstacle information through image processing, and may be provided such that the driver may accurately grasp the situation around the vehicle when driving, reversing, or parking in the vehicle.

On the other hand, vehicle lamps including vehicle headlights mainly use a PWM method for controlling LEDs with PWM (Pulse Width Modulation) signals.

However, since ON or OFF cycles of the lamp using the PWM method and the image capturing cycle of the camera are independent of each other, when the image photographed by the camera is displayed on a camera monitor system, a phenomenon (flickering) in which the screen flickers may occur.

There is a problem in that the image including such flickering causes fatigue to the driver's eyes or distracts the driver's attention due to the output of the image that flickers more than necessary.

SUMMARY

The present disclosure has been made to solve the abovementioned problems occurring in the prior art while advantages achieved by the prior art are maintained intact.

An aspect of the present disclosure provides an apparatus and method for controlling an operation of a vehicle capable of reducing eye fatigue of a driver by displaying an image obtained by a camera while a light source is turned on.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an operation control apparatus of a vehicle includes a signal obtainer that obtains a horizontal synchronization signal of an image photographing device, a driver that drives a light source based on a driving frequency, and a controller that sets the driving frequency based on the horizontal synchronization signal of the image photographing device.

In an embodiment, the controller may set the driving frequency to have a multiplicative relationship with a frequency corresponding to the horizontal synchronization signal.

According to an aspect of the present disclosure, an operation control apparatus of a vehicle includes a photographing device that obtains an image by photographing an area including an irradiation area of a light source, an analyzer that analyzes the obtained image and predicts a driving frequency of the light source based on a horizontal synchronization signal of the photographing device, and a controller that sets the horizontal synchronization signal of the photographing device based on the predicted driving frequency of the light source.

In an embodiment, the analyzer may predict the driving frequency of the light source when a flickering is detected from the obtained image, based on a time between a first time point in which the image is photographed in response to the horizontal synchronization signal of the photographing device when the light source is driven, and a second time point in which the image is photographed in response to the horizontal synchronization signal of the photographing device when the light source is driven subsequently.

In an embodiment, the controller may set a frequency corresponding to the horizontal synchronization signal of the photographing device to have a multiplicative relationship with the predicted driving frequency of the light source.

In an embodiment, the controller may increase a frequency corresponding to the horizontal synchronization signal by a multiple of the predicted driving frequency of the light source until the flickering of the obtained image is resolved.

In an embodiment, the driver frequency may be a PWM (Pulse Width Modulation) type signal.

According to an aspect of the present disclosure, an operation control method of a vehicle includes obtaining a horizontal synchronization signal of an image photographing device, driving a light source based on a driving frequency, and setting the driving frequency based on the horizontal synchronization signal of the image photographing device.

In an embodiment, the setting of the driving frequency based on the horizontal synchronization signal of the image photographing device may include setting the driving frequency to have a multiplicative relationship with a frequency corresponding to the horizontal synchronization signal.

According to another aspect of the present disclosure, an operation control method of a vehicle includes obtaining an image by photographing an area including an irradiation area of a light source, analyzing the obtained image and predicting a driving frequency of the light source based on a horizontal synchronization signal of the photographing device, and setting the horizontal synchronization signal of the photographing device based on the predicted driving frequency of the light source.

In an embodiment, the analyzing of the obtained image and predicting of the driving frequency of the light source based on the horizontal synchronization signal of the photographing device may include predicting the driving frequency of the light source when a flickering is detected from the obtained image, based on a time between a first time point in which the image is photographed in response to the horizontal synchronization signal of the photographing device when the light source is driven, and a second time point in which the image is photographed in response to the horizontal synchronization signal of the photographing device when the light source is driven subsequently.

In an embodiment, the setting of the horizontal synchronization signal of the photographing device based on the predicted driving frequency of the light source may include setting a frequency corresponding to the horizontal synchronization signal of the photographing device to have a multiplicative relationship with the predicted driving frequency of the light source.

In an embodiment, the setting of the horizontal synchronization signal of the photographing device based on the predicted driving frequency of the light source may include increasing a frequency corresponding to the horizontal sync signal by a multiple of the predicted driving frequency of the light source until the flickering of the obtained image is resolved.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 4.

Figure 1:
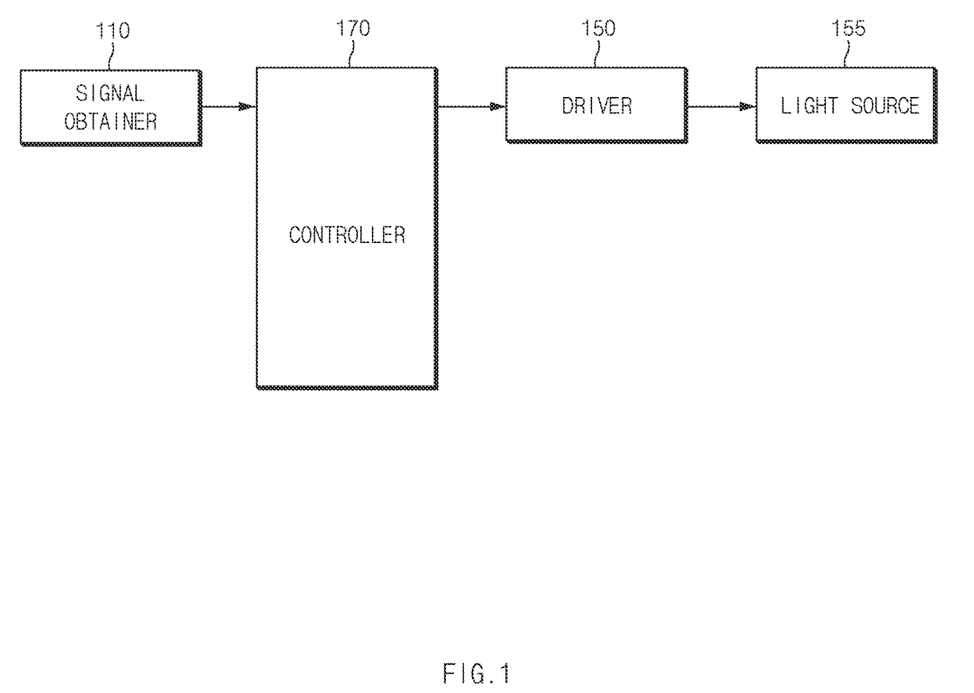
FIG. 1 is a block diagram illustrating an operation control apparatus of a vehicle according to a first embodiment of the disclosure.
Figure 2:
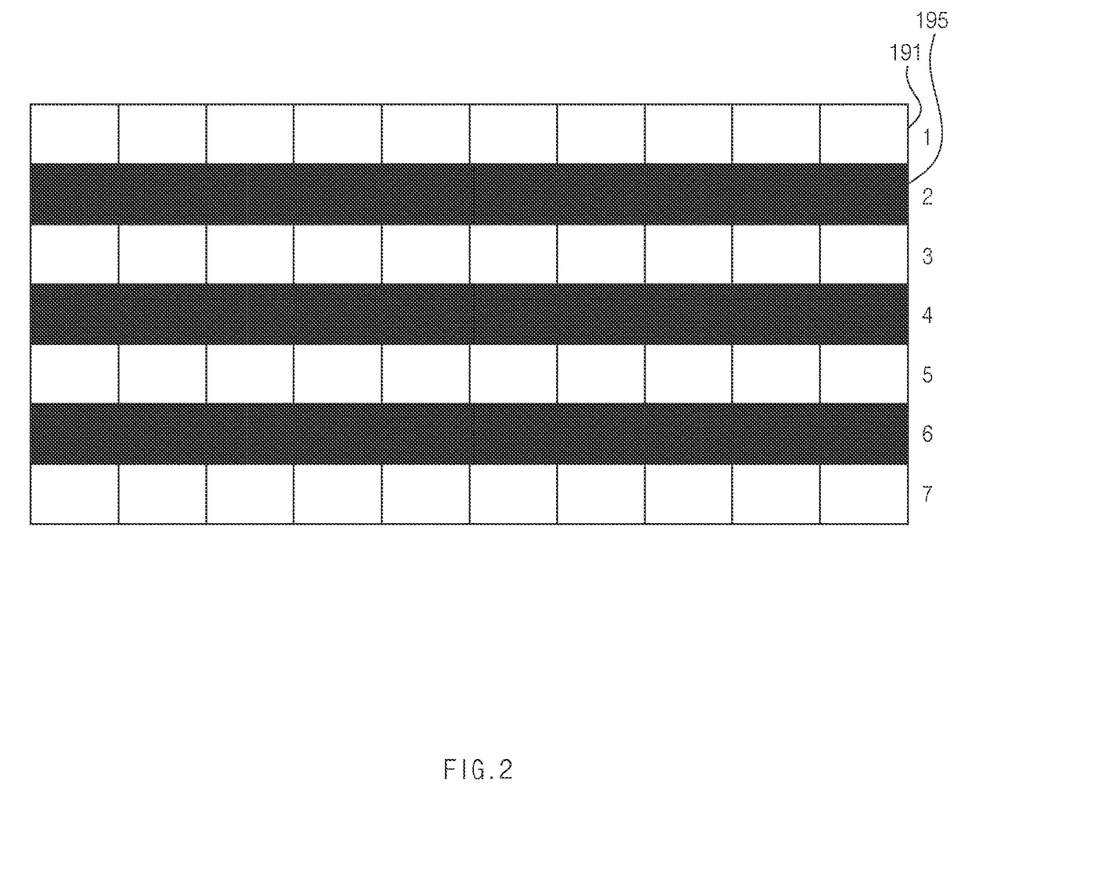
FIG. 2 is a diagram describing a flickering sensing operation of an operation control apparatus of a vehicle according to a first embodiment of the present disclosure.
Figure 3:
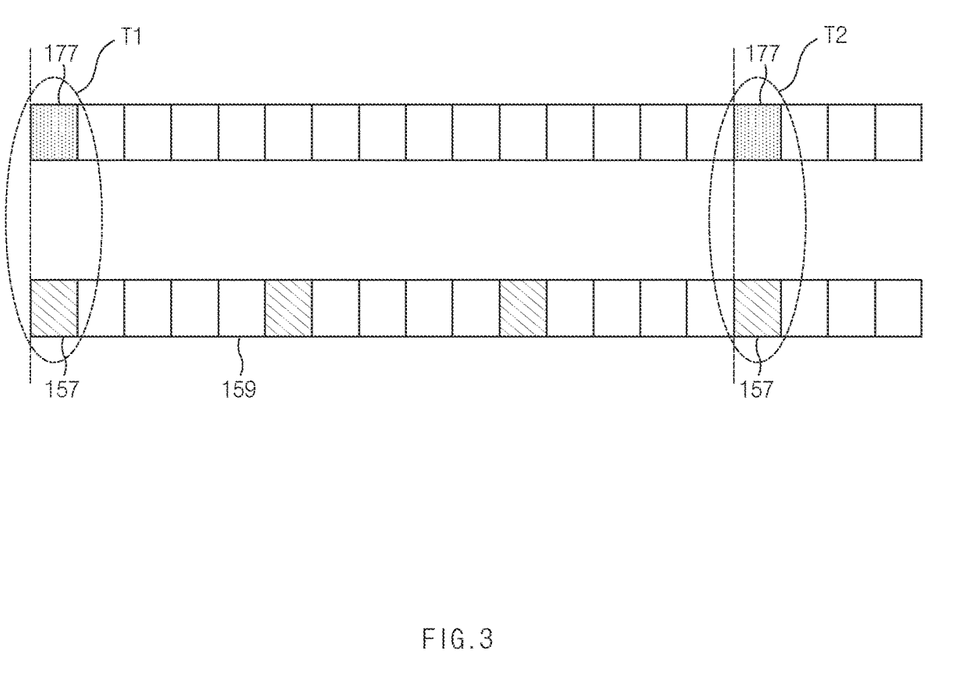
FIG. 3 is a diagram describing a prevention operation of a flickering occurrence in an operation control apparatus of a vehicle according to a first embodiment of the disclosure.

FIG. 1 is a block diagram illustrating an operation control apparatus of a vehicle according to a first embodiment of the disclosure, FIG. 2 is a diagram describing a flickering sensing operation of an operation control apparatus of a vehicle according to a first embodiment of the present disclosure, and FIG. 3 is a diagram describing a prevention operation of a flickering occurrence in an operation control apparatus of a vehicle according to a first embodiment of the disclosure.

First, referring to FIG. 1, an operation control apparatus of a vehicle according to a first embodiment of the present disclosure may include a signal obtainer 110, a driver 150, a light source 155, and a controller 170.

The signal obtainer 110 may obtain a horizontal synchronization (HSYNC) signal from an image photographing device (not illustrated), and may transfer the obtained horizontal synchronization signal to the controller 170. For example, the signal obtainer 110 may obtain the horizontal synchronization signal from the image photographing device through a communication line. In addition, according to an embodiment, the signal obtainer 110 may obtain the horizontal synchronization signal by analyzing an image transferred from the image photographing device. In this case, the image photographing device may include a camera such as a black box device that acquires the image by photographing an image at a preset photographing interval, and the photographing interval may be set based on the HSYNC signal.

The driver 150 (LED driving module) may drive the light source 155 at preset lighting intervals, based on a driving frequency. The driver 150 may drive the light source 155 to repeatedly turn on (ON) and turn off (OFF), based on a PWM (Pulse Width Modulation) method. For example, the driver 150 may drive the light source based on a driving frequency set by the controller 170.

For example, the PWM frequency for a repetition of turning on and turning off the light source 155 may be set to 60 Hz or more so as not to be recognized by the human eye. The light source 155 may be composed of a plurality of LEDs, for example, may be disposed in a headlamp of a vehicle.

The controller 170 may set the driving frequency based on the horizontal synchronization signal of the image photographing device. For example, the controller 170 may set the driving frequency to be in synchronization with the horizontal synchronization signal transferred from the signal obtainer 110. The controller 170 may transfer the set driving frequency to the driver 150. For example, the controller 170 may include a body control unit (BCM).

On the other hand, referring to FIG. 2, when the horizontal synchronization signal is synchronized with the driving frequency of the light source 155, a horizontal line 191 of an image photographed by the image photographing device is illustrated, and when the horizontal synchronization signal is not synchronized with the driving frequency of the light source 155, a horizontal line 195 of an image photographed by the image photographing device is illustrated.

In this way, even if an image is taken based on the HSYNC signal, a state in which a line in which a photographed image is displayed and a line in which a dark image is displayed are repeated depending on the on or off state of the light source 155 may occur.

That is, when the frequency of the HSYNC signal, which is a time point at which the image is photographed through the image photographing device is not synchronized with the frequency of the PWM signal for driving the light source 155, a flickering may occur.

For example, the controller 170 may recognize that the flickering is occurred when a predetermined pixel value or less is detected for a line on which the dark image is displayed.

Referring to FIG. 3, when the flickering occurs, the controller 170 may set the driving frequency of the light source 155 such that a timing ('a' in FIG. 3) of the HSYNC signal received through the signal obtainer 110 is synchronized with a lighting timing ('b' in FIG. 3) of the light source 155.

For example, the controller 170 may set the frequency of the PWM signal for driving the light source 155 to be multiplied by a frequency of the HSYNC signal and then may transfer it to the driver 150. Through this, a timing 177 of the frequency of the HSYNC signal may be synchronized with a timing 157 of the frequency of the PWM signal (T1 and T2).

For example, when the frequency of the HSYNC signal is 30 Hz, the controller 170 may set the frequency of the PWM signal for driving the light source 155 to a multiple of 30 Hz, such as 30 Hz, 60 Hz, 90 Hz, etc.

Therefore, when resetting the frequency of the PWM signal driving the light source 155 to be a multiple of a frequency of a photographing interval (T1 to T2), since the timing of the HSYNC signal is synchronized with a lighting timing of the light source 155, an image photographed without the flickering may be displayed on a display when photographing an image through the image photographing device.

Hereinafter, an operation control method of a vehicle according to a first embodiment of the present disclosure will be described in detail with reference to FIG. 4.

Figure 4:
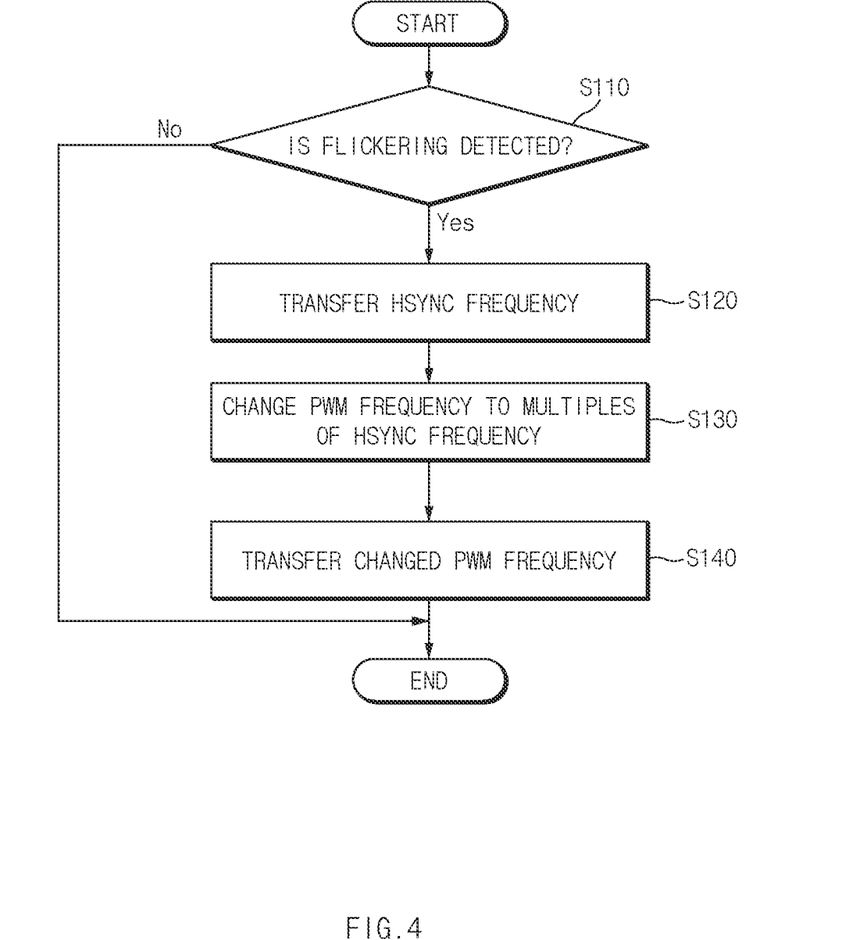
FIG. 4 is a flowchart describing an operation control method of a vehicle according to a first embodiment of the disclosure.

FIG. 4 is a flowchart describing an operation control method of a vehicle according to a first embodiment of the disclosure. Hereinafter, it is assumed that an operation control apparatus of a vehicle of FIG. 1 performs a process of FIG. 4.

First, the image photographing device may be driven to capture an image at a frequency of a predetermined HSYNC signal, and the light source 155 may be turned on at a frequency of a predetermined PWM signal.

Subsequently, when the flickering is detected in the image photographed by the image photographing device (S110), the controller 170 may receive the HSYNC signal transferred through the signal obtainer 110 (S120).

Subsequently, the controller 170 may set the frequency of the PWM signal for driving the light source 155 to be a multiple of the HSYNC frequency such that the timing of the HSYNC signal is synchronized with the lighting timing of the light source 155 (S130).

Subsequently, when the frequency of the PWM signal for driving the light source 155 is transferred to the driver 150 to be a multiple of the frequency of the photographing interval (T1 to T2) (S140), since the timing of the HSYNC signal is synchronized with the lighting timing of the light source 155, an image photographed without the flickering may be displayed on a display when photographing an image through the image photographing device.

Figure 5:
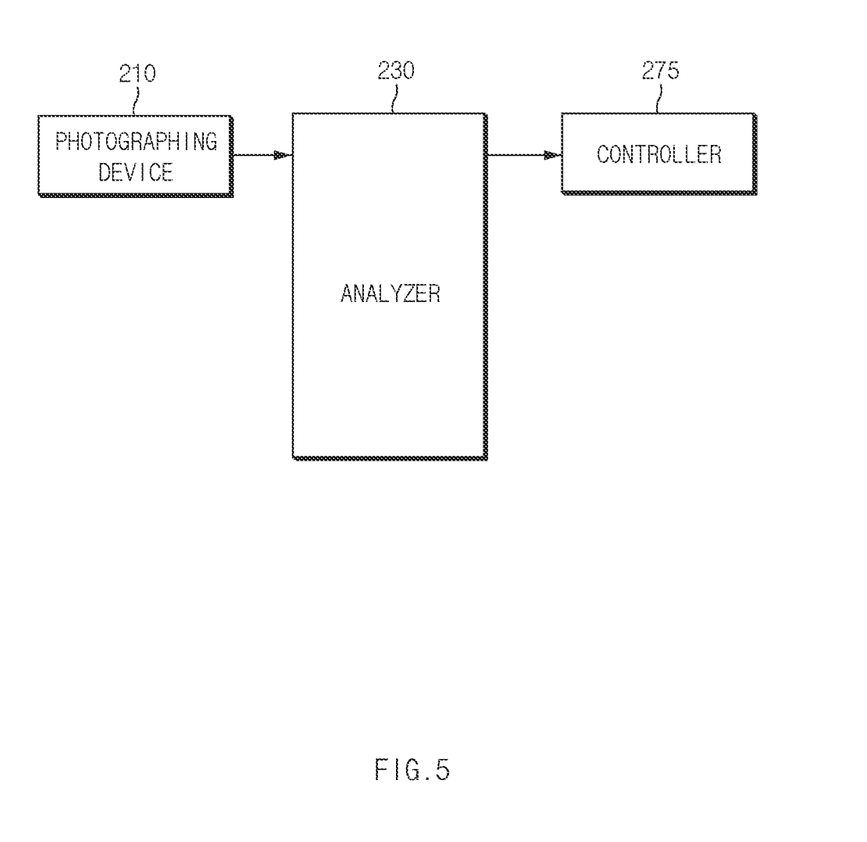
FIG. 5 is a block diagram illustrating an operation control apparatus of a vehicle according to a second embodiment of the disclosure.
Figure 6:
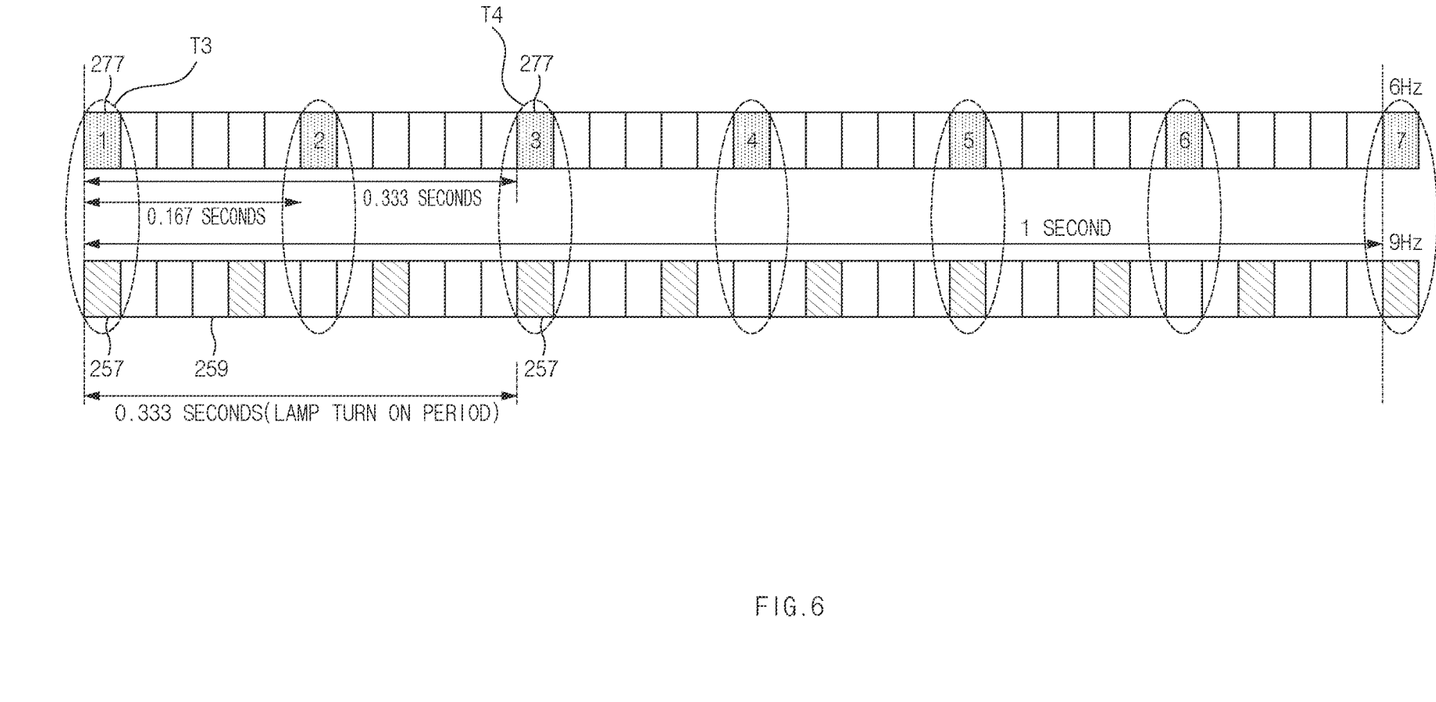
FIG. 6 is a diagram describing a prevention of occurrence of flickering through an operation control apparatus of a vehicle according to a second embodiment of the disclosure.

FIG. 5 is a block diagram illustrating an operation control apparatus of a vehicle according to a second embodiment of the disclosure, and FIG. 6 is a diagram describing a prevention of occurrence of flickering through an operation control apparatus of a vehicle according to a second embodiment of the disclosure.

First, referring to FIG. 5, an operation control apparatus of a vehicle according to a second embodiment of the present disclosure may predict the driving frequency of a vehicle external light source and may set the frequency of the HSYNC signal of a photographing device 210.

An operation control apparatus of a vehicle according to a second embodiment of the present disclosure may include the photographing device 210, an analyzer 230, and a controller 270.

Hereinafter, the vehicle external light source will be described as an example of a light source of a street lamp, but is not limited thereto.

For example, the light source of the street lamp installed on a road may also be driven using the PWM signal. When a vehicle acquires an image through the photographing device 210, which is an image photographing device, around the street lamp, when the frequency of the PWM signal of the street lamp light source is not synchronized with the frequency of the HSYNC signal of the photographing device 210, the flickering may occur.

The analyzer 230 may receive the image photographed by the photographing device 210 and may analyze the received image. The analyzer 230 may predict the frequency of the PWM signal of the street lamp light source, based on the HSYNC signal of the photographing device 210. For example, the analyzer 230 may receive the HSYNC signal from the photographing device 210 through a communication line.

When the image photographed by the photographing device 210 is displayed in the flickering, the controller 270 may reset the frequency of the HSYNC signal of the photographing device 210, based on the frequency of the PWM signal of the street lamp light source predicted by the analyzer 230. This will be described in more detail below.

Referring to FIG. 6, when the flickering occurs, the controller 270 may reset the frequency of the HSYNC signal of the photographing device 210 such that a timing ('a' in FIG. 6) of the HSYNC signal is synchronized with a lighting timing ('b' in FIG. 6) of the street lamp light source through the frequency of the PWM signal of the street lamp light source predicted by the analyzer 230.

The analyzer 230 may predict the frequency of the PWM signal of the street lamp light source through a fundamental frequency f0 for the time interval (T3 to T4) in which a timing 277 of the frequency of the HSYNC signal and a timing 257 of the frequency of the PWM signal coincide with each other.

For example, a period of the HSYNC signal for the time interval (T3 to T4) is 0.333 seconds, and when it is converted to a frequency, it may be about 3 Hz, and may be set as the fundamental frequency f0. Accordingly, the predicted frequency of the PWM signal of the street lamp light source may be about 3 Hz.

Then, when the frequency of the PWM signal of the street lamp light source is predicted, the controller 270 may change the frequency of the HSYNC signal while multiplying by an integer multiple of the predicted frequency of the PWM signal of the street lamp light source until the flickering does not occur in the image taken through the photographing device 210.

For example, when the frequency of the PWM signal of the street lamp light source predicted for the time interval (T3 to T4) is 30 Hz, the controller 270 may increase the frequency of the HSYNC signal by an integer multiple of 30 Hz, until the flickering does not occur in the photographed image. That is, the frequency of the HSYNC signal may be increased to 30 Hz, 60 Hz, 90 Hz, 120 Hz, 150 Hz, etc., until the flickering disappears.

Subsequently, when the flickering does not occur at 90 Hz while the controller 270 increases the frequency of the HSYNC signal, the controller 270 may finally predict that the PWM frequency of the street lamp light source is at least 90 Hz or more, and the controller 270 may reset the frequency of the HSYNC signal to 90 Hz to allow the image to be photographed through the image photographing device.

Therefore, when resetting the frequency of the HSYNC signal to be a multiple of a frequency of a photographing interval (T3 to T4), since the timing of the HSYNC signal is synchronized with a lighting timing of the street lamp light source, an image photographed without the flickering may be displayed on a display when photographing an image through the photographing device 210.

Hereinafter, an operation control method of a vehicle according to a second embodiment of the present disclosure will be described in detail with reference to FIG. 7.

Figure 7:
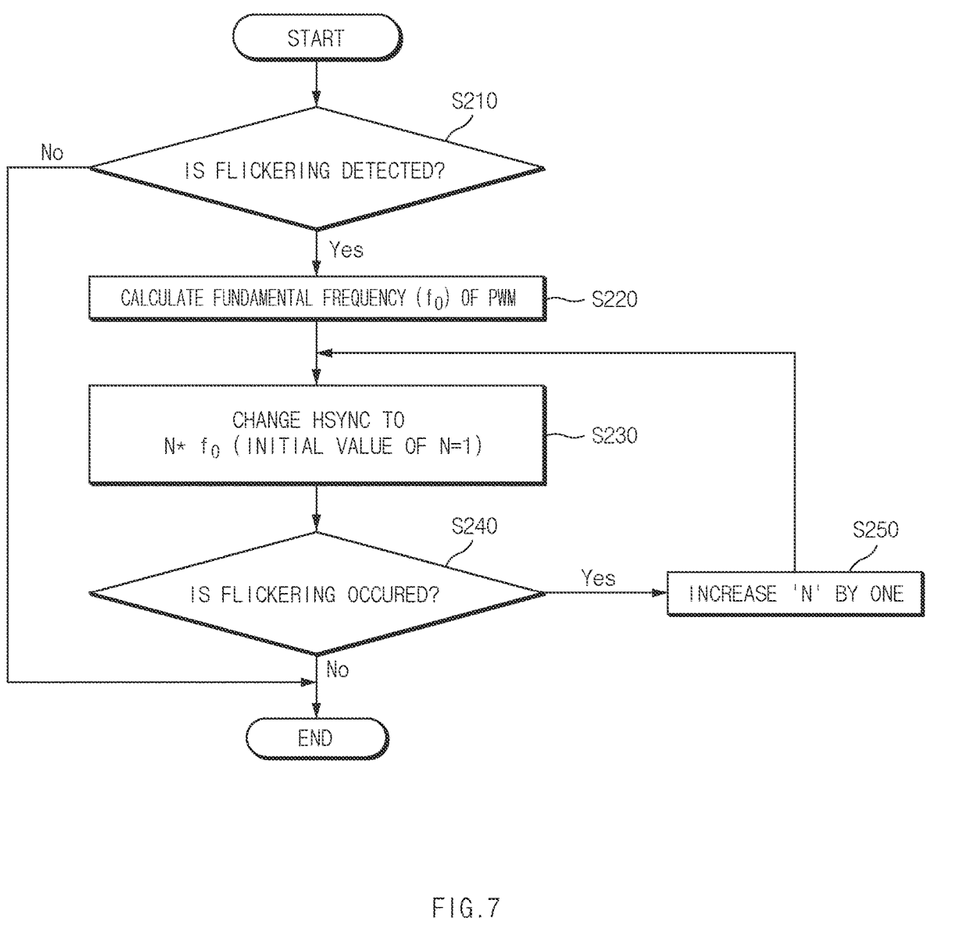
FIG. 7 is a flowchart describing an operation control method of a vehicle according to a second embodiment of the disclosure.

FIG. 7 is a flowchart describing an operation control method of a vehicle according to a second embodiment of the disclosure. Hereinafter, it is assumed that an operation control apparatus of a vehicle of FIG. 5 performs a process of FIG. 7.

First, the photographing device 210 is driven such that an image is photographed with a predetermined HSYNC signal around the street lamp, and when the flickering is detected in the image photographed through the photographing device 210 (S210), the fundamental frequency (f0) for the time interval (T3 to T4) in which the timing 277 of the frequency of the HSYNC signal coincides with the timing 257 of the frequency of the PWM signal may be calculated (S220).

Subsequently, the frequency of the HSYNC signal is changed while increasing by an integral multiple of the fundamental frequency (S230), and until the flickering does not occur (S240), the frequency of the HSYNC signal may be changed while increasing by an integral multiple of the fundamental frequency (S250).

Subsequently, the timing of the HSYNC signal is synchronized with the timing of the street lamp light source, and when an image is photographed through the photographing device 210, the photographed image may be displayed on a display without the flickering.

As described above, according to the present disclosure, the driver's eye fatigue may be reduced by allowing an image obtained by a camera to be displayed only in a state in which the lamp of the vehicle is turned on.

According to the present disclosure, an embodiment of the present disclosure may reduce eye fatigue of a driver by displaying an image obtained by a camera while a light source is turned on.

The above description is merely illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. An apparatus for driving a light source of a vehicle, comprising:
    a photographing device configured to capture an image of an area including an irradiation area of the light source;
    an analyzer configured to (1) receive, from the photographing device, the captured image, (2) analyze the received image to obtain a horizontal synchronization signal of the received image and (3) predict, based on the obtained horizontal synchronization signal, a frequency of a Pulse Width Modulation (PWM) signal for driving the light source; and
    a controller configured to adjust, based on the predicted frequency of the PWM signal, the horizontal synchronization signal,
    wherein, in response to detecting a flickering from the received image, the controller increases the frequency of the horizontal synchronization signal by an integer multiple of the predicted frequency of the PWM signal until the flickering is resolved, and
    wherein, when the flickering is detected from the received image, the analyzer is configured to predict the frequency of the PWM based on a time period between (1) a first time at which the image is photographed in response to the horizontal synchronization signal when the light source is driven, and (2) a second time at which the image is photographed in response to the horizontal synchronization signal when the light source is driven subsequently.

2. A method for driving a light source of a vehicle, the method comprising:
    receiving, from an image photographing device, an image captured by the image photographing device;
    analyzing the received image to obtain a horizontal synchronization signal of the received image;
    predicting, based on the obtained horizontal synchronization signal, a frequency of a Pulse Width Modulation (PWM) signal for driving the light source;
    adjusting, based on the frequency of the PWM signal, the horizontal synchronization signal;
    driving, based on the adjusted horizontal synchronization signal, the light source; and
    in response to detecting a flickering from the received image, increasing the frequency of the horizontal synchronization signal by an integer multiple of the predicted frequency of the PWM signal until the flickering is resolved, and
    wherein, when the flickering is detected from the received image, the frequency of the PWM is predicted based on a time period between (1) a first time at which the image is photographed in response to the horizontal synchronization signal when the light source is driven, and (2) a second time at which the image is photographed in response to the horizontal synchronization signal when the light source is driven subsequently.

\* \* \* \* \*